Figure 3:
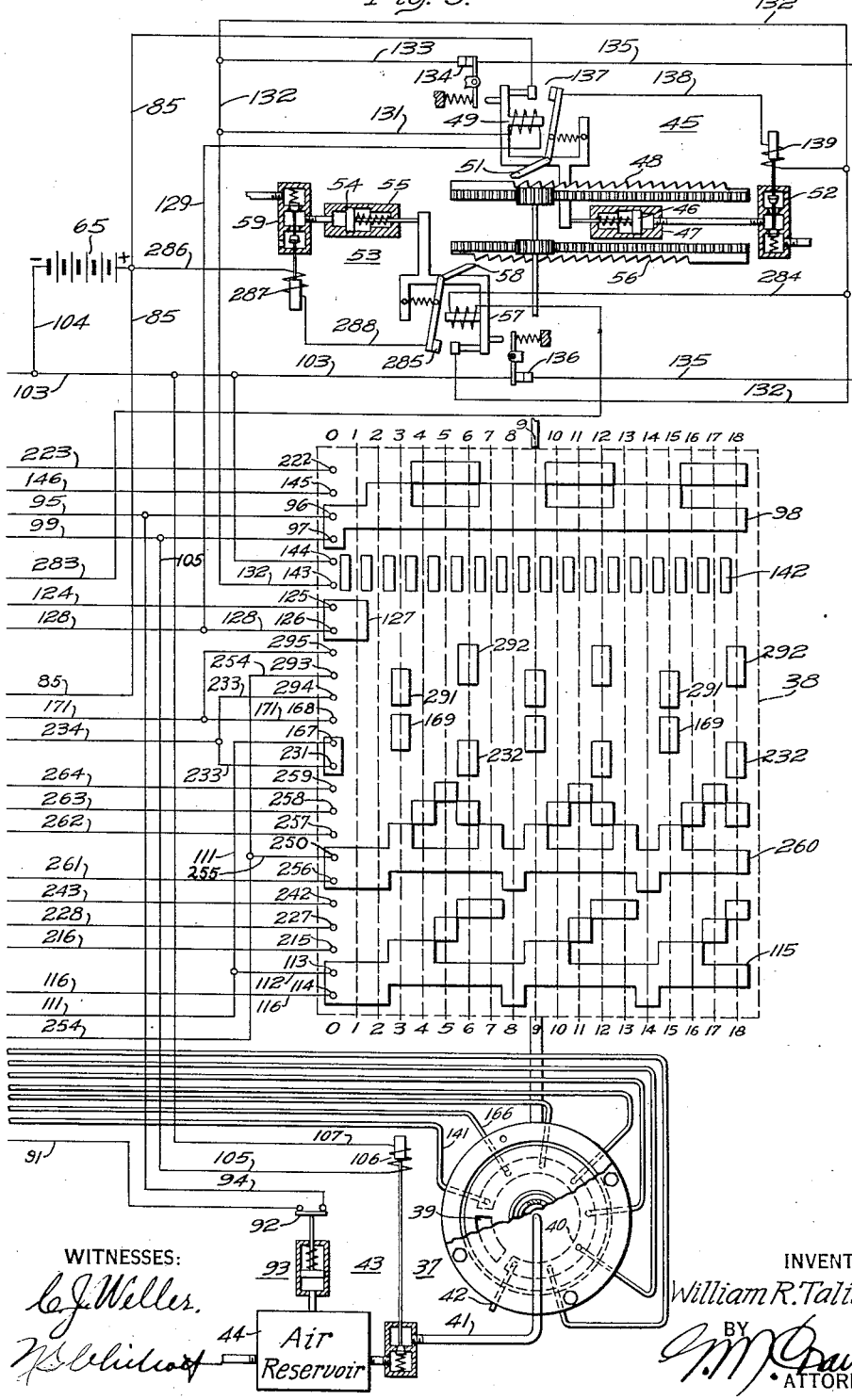

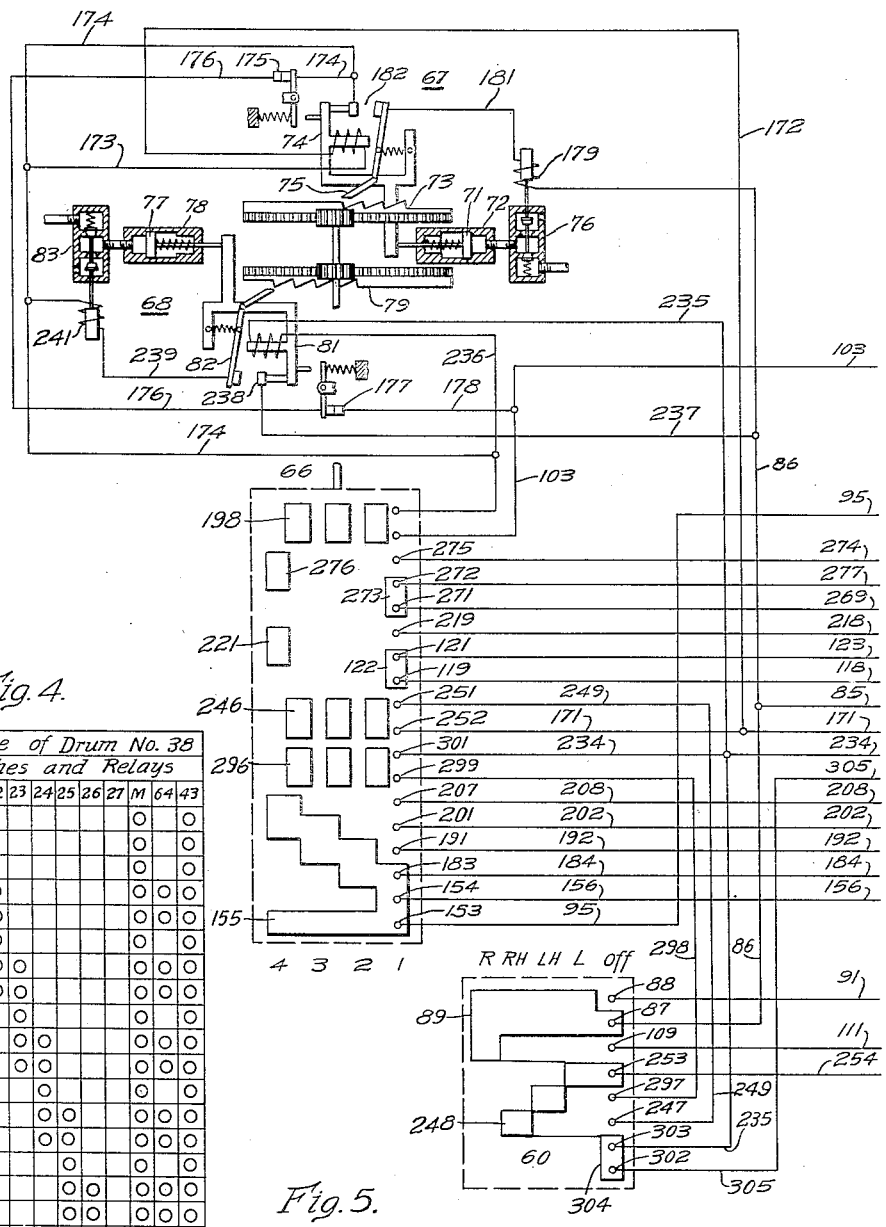

Dec. 14, 1937.                W. R. TALIAFERRO                2,101,880
                                 CONTROL SYSTEM
                       Filed Oct. 15, 1935          3 Sheets-Sheet 2
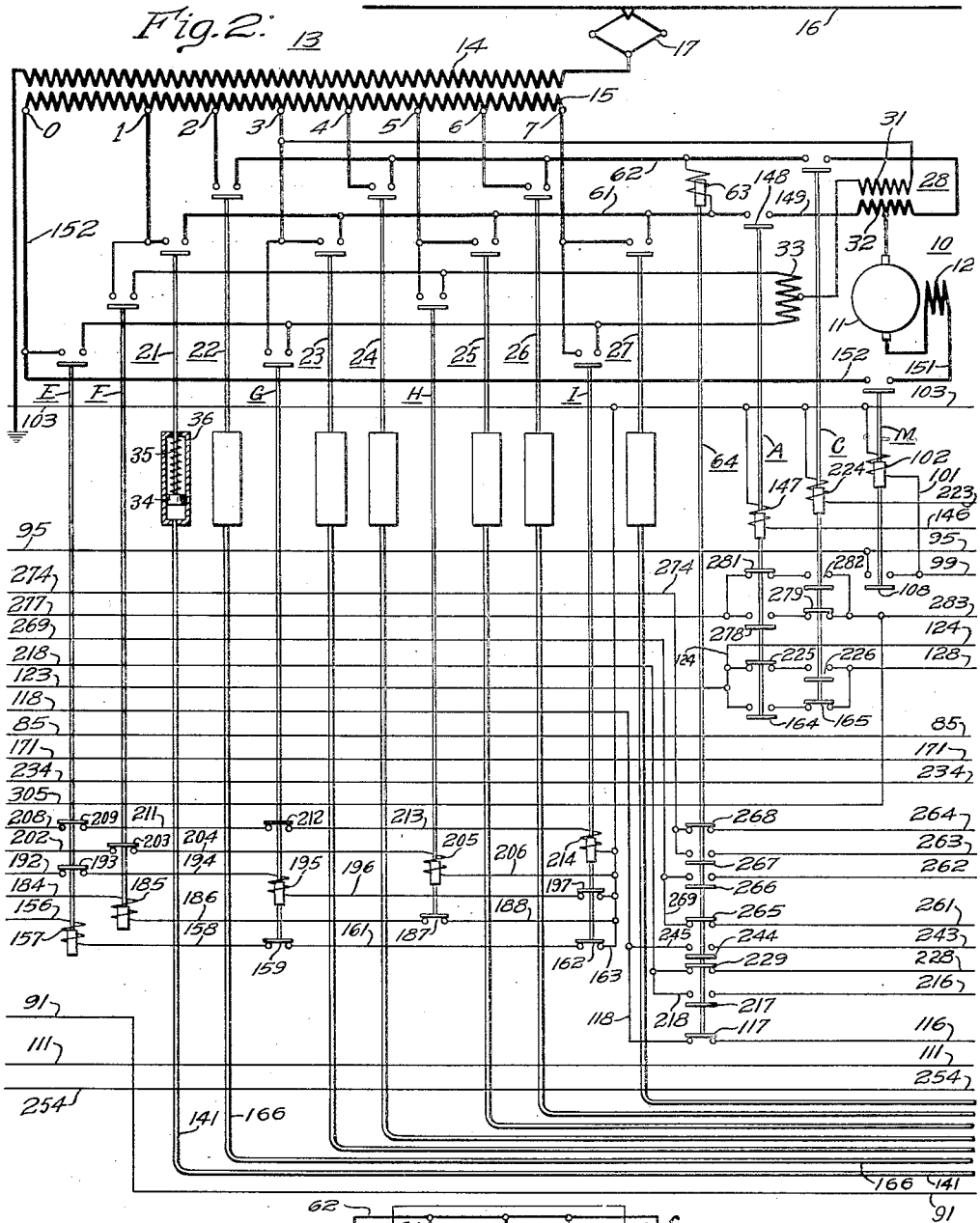
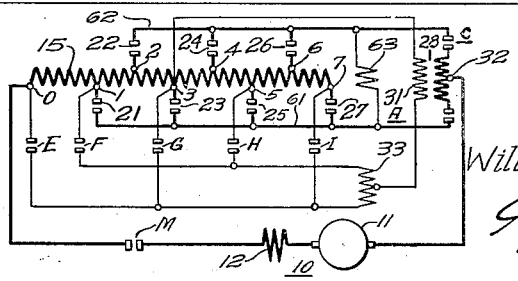
WITNESSES:                                                    INVENTOR
                                                      William R. Taliaferro.
                                                              BY
                                                                    ATTORNEY Dec. 14, 1937.    W. R. TALIAFERRO    2,101,880
CONTROL SYSTEM
Filed Oct. 15, 1935    3 Sheets-Sheet 3

WITNESSES:
C. J. Weller.
[signature]

INVENTOR
William R. Taliaferro.
BY
[signature]
ATTORNEY

Patented Dec. 14, 1937

2,101,880

UNITED STATES PATENT OFFICE 2,101,880

CONTROL SYSTEM

William R. Taliaferro, Pittsburgh, Pa., assignor to Westinghouse Electric & Manufacturing Company, East Pittsburgh, Pa., a corporation of Pennsylvania Application October 15, 1935, Serial No. 45,049

10 Claims. (Cl. 171—119)

My invention relates, generally, to control systems and more particularly to systems for controlling the operation of electrically-propelled vehicles.

The copending application of W. R. Taliaferro, C. C. Whittaker and L. G. Riley, Serial No. 45,048, filed October 15, 1935, describes and claims a tap-changing system in which air-operated tap-changing switches are so connected in the system that they never interrupt the power circuit. The circuit breaking duty is performed by four transition switches and a transition resistor, or reactor, is so connected between these four switches that surges during the switching operations are greatly reduced.

The invention disclosed in the present application relates to improvements in the tap-changing system described in the aforesaid copending application and has for one of its objects the further simplification of the system and the reduction in the weight and cost of the apparatus utilized in the system.

Another object of the invention is to increase the number of voltage steps or notches obtainable from a power transformer without increasing the number of taps on the transformer winding.

A further object of the invention is to reduce arcing of the transition switches during the tap-changing operations.

Other objects of the invention will be explained fully hereinafter or will be apparent to those skilled in the art.

According to the present invention, air-operated switches are utilized for tap-changing and a pair of transition switches are provided for interrupting the power circuit. The operation of the tap-changing switches is controlled by a rotary air valve driven by the same shaft as the sequence drum which controls the operation of the transition switches. In order to increase the number of voltage steps or notches without increasing the number of taps on the transformer winding, and to reduce arcing on the transition switches a buck and boost transformer and several vernier switches are utilized in connection with the main power transformer and the tap-changing and transition switches. The buck and boost transformer is so connected in the power circuit that the transition switches have equal voltages on each side of them whenever they are required to open or close the power circuit, thereby reducing the duty imposed on the transition switches and reducing arcing across the contact members.

For a fuller understanding of the nature and objects of the invention, reference may be had to the following detailed description, taken in conjunction with the accompanying drawings, in which:

Figures 1, 2 and 3 may be combined to constitute a diagrammatic view of a control system embodying the invention;

Figs. 4 and 5 are charts showing the sequence of operation of a portion of the apparatus shown in Figs. 1, 2 and 3, and Fig. 6 is a diagrammatic view showing the main power circuit.

Referring to the drawings, the system shown comprises a motor 10 having an armature 11 and a series field winding 12, and a main transformer 13 having a primary winding 14 and a secondary winding 15. The transformer 13 is energized from a trolley conductor 16 through a pantograph 17. The conductor 16 may be connected to any suitable source of power, such as a power generating station (not shown).

A plurality of tap-changing switches 21 to 27, inclusive, are provided for increasing the voltage applied to the motor 10 in a step-by-step manner well known in the art. Transition switches A and C and an auxiliary buck and boost transformer 28 cooperate in connecting the tap-changing switches to the motor 10. A motor cut-out switch M is provided for disconnecting the motor from the transformer 13.

As shown, the auxiliary transformer 28 is provided with a primary winding 31 and a secondary winding 32, one terminal of the motor 10 being connected to the mid-point of the secondary winding 32. A plurality of vernier switches E, F, G, H, and I are provided for successively connecting the primary winding 31 to certain of the taps on the main transformer 13.

The auxiliary transformer 28 functions to increase the number of notches or voltage steps applicable to the motor 10 without increasing the number of taps on the main transformer and also to reduce the duty imposed upon the transition switches A and C. The vernier switches E to I, inclusive, are operated in sequential relation to cause the auxiliary transformer to alternately buck and boost the voltage obtained from the main transformer, thereby increasing the number of voltage steps. In the system shown, three intermediate steps are provided for each step on the main transformer. It will be understood that the number of steps may be increased by providing additional vernier switches. A preventive resistor or reactor 33 is provided to permit certain of the vernier switches which are not connected to a common bus to be closed at the same time.

The duty imposed upon the transition switches A and C, which interrupt the power circuit during the tap-changing operation, is reduced by making the voltage of the secondary winding 32 of the auxiliary transformer 28 such that the voltages on each side of the transition switches are substantially equal when the switches open or close the power circuit. In this manner the transition switches may be operated with reduced arcing at the contact members, thereby prolonging the life of the switch.

In the system shown, the auxiliary transformer 28 has a ratio of three to one and the primary winding 31 may be so connected to the secondary winding 15 of the main transformer that a maximum of three times the voltage between taps on the main transformer may be impressed on the primary winding 31, thereby making the voltage across the secondary winding 32 equal to the voltage between taps on the main transformer. The vernier switches E to I, which connect the primary winding of the auxiliary transformer to the main transformer, are so operated that the voltage of the auxiliary transformer changes from maximum buck to maximum boost during each step on the main transformer.

Assuming that the voltage between taps 1 and 2, 2 and 3, etc., is 75 volts and that the voltage from 0 to 1 is 150 volts, the voltage of the secondary winding 32 changes from 75 volts buck to 75 volts boost for each step on the main transformer. Thus, if switches 21, E, F and A are closed, the voltage applied to the motor 10 is the voltage from 0 to 1 less one half of the voltage from 1 to 2, since the motor is connected to the midpoint of the winding 32, or 150 volts minus 37½ volts which equals 112½ volts. When switch E is opened and G is closed, 25 volts are added, opening F and closing H adds 25 volts more, and opening G and closing I adds another 25 volts, raising the motor voltage to 187½. The voltage at tap 2 is 225, but the voltage from the midpoint of the winding 32, where the motor 10 is connected, to the end of the winding where the switch C is connected, is 37½ volts which added to the motor voltage of 187½ equals 225 volts. Therefore, if switch 22 is closed, the voltage at one side of the switch C is 225 and the voltage at the other side is also 225, since these voltages are equal and opposite, the switch C can be closed with no change in voltage and switches 22 and C are then in parallel with switches 21 and A, each pair carrying half of the load current. Switch A can then be opened, followed by switch 21, transferring all of the load to switches 22 and C. However, there is no difference in potential to maintain an arc when switch A is opened.

The vernier switches are now operated in the reverse order, again raising the motor voltage in three 25 volt steps and also making the voltage on the load side of switch A equal to the voltage of tap 3, which permits switch A to be closed without any disturbance after switch 23 is closed. In like manner, the sequence is continued until the last tap-changing switch 27 is closed.

As explained hereinbefore, the control system is so designed that the tap-changing switches do not interrupt the power circuit through the motor 10, the transition switches A and C being utilized for that purpose. The tap-changing switches may be operated by air or other suitable fluid pressure. As shown, the moving contact member of the tap-changing switch 21 is actuated by a piston 34 which opposes a spring 35, both of which are disposed in a cylinder 36. The other tap-changing switches are similar to the switch 21.

The operation of the tap-changing switches 21 to 27, inclusive, is controlled by a rotary air valve 37, driven by the shaft of a sequence drum 38 which controls the operation of the transition switches A and C. In this manner, the operation of the tap-changing switches and the transition switches is so controlled that the tap-changing switches can only close or open when the power circuits to which the respective tap-changing switches are connected are either open or carrying no current.

The rotary air valve is provided with an inlet cavity 39 and an exhaust cavity 40. The pressure fluid is admitted to the valve through a pipe 41 and exhausted through a pipe 42. As the valve is rotated, the inlet cavity 39 alternately covers one and then two ports to which pipes leading to the tap-changing switch cylinders are connected while the exhaust cavity 40 covers the remaining ports, thereby operating the tap-changing switches 21 to 27 in a definite sequence. An electrically-operated fluid valve 43 controls the flow of air from an air reservoir 44 to the rotary valve 37.

The valve 37 and the sequence drum 38 are rotated in one direction by a notching device 45 similar to the device fully described in Patent No. 1,987,709, issued January 15, 1935 to L. G. Riley. Briefly, the notching device 45 comprises a piston 46 disposed in a cylinder 47, a rack 48 which is geared to the shaft of the sequence drum 38, an electromagnet 49, a trigger 51 actuated by the magnet 49 and an electrically operated fluid valve 52 for controlling the admission of a pressure fluid to the cylinder 47. The electromagnet 49 and the trigger 51 are carried by the piston 46 and the trigger is disposed to engage the rack 48 to advance it one notch for each stroke of the piston 46.

A similar notching device 53 is provided for rotating the valve 37 and the drum 38 in the opposite direction. The notching device 53 comprises a piston 54 disposed in a cylinder 55, a rack 56, an electromagnet 57, a trigger 58 and a fluid valve 59.

The operation of the notching devices 45 and 53 may be manually controlled by a master controller 60 of the drum type. The controller shown has five positions, an "off", "lower", "lower hold", "raise hold" and "raise" position. In the "raise" position of the controller 60, the voltage on the traction motor is increased one step at a time until the maximum is reached. If the controller handle is placed in either one of the "hold" positions, the notching device stops. Further advance is obtained by again placing the handle in the "raise" position, or the voltage can be lowered by placing the handle in the "lower" position. When the controller handle is in the "off" position, all power is removed from the motor 10 and the sequence drum 38 must be returned to the full "off" position by the notching device 53 before power can be re-applied.

It will be seen that the tap-changing switches 21, 23, 25 and 27 are connected to a bus 61 and the tap-changing switches 22, 24 and 26 are connected to another bus 62. The buses 61 and 62 are connected to the secondary winding 32 of the transformer 28 by the transition switches A and C, respectively. The motor 10 is connected to the mid-point of the winding 32, as previously explained.

The actuating coil 63 of a protective relay 64 is connected between the buses 61 and 62. The function of the relay 64 is to stop the advancement or retraction of the sequence drum 38 in case both buses 61 and 62 are energized when only one should be energized and to stop the drum in case only one bus is energized when both should be energized, also to stop the drum in the event that line power fails.

A battery 65, or other reliable source of power may be utilized to provide energy for operating the control apparatus in the system.

The transition switches A and C are provided with protective interlocks which cooperate with the relay 64 to insure the proper operation of the various switches. These interlocks are connected to prevent the operation of the notching engine 45 if the switches do not follow the normal sequence of operation. If desired, certain of the tap-changing switches may be mechanically interlocked with each other as an additional safeguard against improper operation of the switches.

The operation of the vernier switches E, F, G, H and I is controlled by a second sequence drum 66 which is rotated in one direction by a notching device 67 and in the opposite direction by a similar notching device 68. The notching device 67 comprises a piston 71 disposed in a cylinder 72, a rack 73, an electromagnet 74, a trigger 75 and a fluid valve 76. Likewise, the notching device 68 comprises a piston 77 disposed in a cylinder 78, a rack 79, an electromagnet 81, a trigger 82 and a fluid valve 83.

As explained hereinbefore, the vernier switches are closed in sequential relation to vary the voltage of the auxiliary transformer 28 during each step on the main transformer 13. Thus switches E to I are closed after tap-changing switch 21 is closed, switches I to E are closed after tap-changing switch 22 is closed and so on during the progression of the system. The operation of the sequence drum 66 is controlled by the sequence drum 38.

In order that the functioning of the foregoing apparatus may be more clearly understood, the operation of the system will now be described in detail. Assuming that it is desired to connect the motor 10 to the power source and to gradually increase the voltage applied to the motor in order to accelerate the vehicle propelled by the motor, the master controller 60 is actuated to the "raise" position, thereby energizing the actuating coils of the switch M and the air valve 43. The energizing circuit for the actuating coil of the switch M may be traced from the positive terminal of the battery 65 through conductors 85 and 86, contact fingers 87 and 88—bridged by contact segment 89 on the master controller 60—conductor 91, contact members 92 of an air pressure relay 93, conductors 94 and 95, contact fingers 96 and 97—bridged by a segment 98 on the sequence drum 38—conductors 99 and 101, actuating coil 102 of the switch M, and conductors 103 and 104 to the negative terminal of the battery 65. The energizing circuit for the actuating coil of the air valve 43 extends from the previously energized conductor 99 through conductor 105, actuating coil 106 of the air valve 43 and conductors 107, 103 and 104 to the battery 65.

A holding circuit for the actuating coils of the switch M and the air valve 43 is established by the closing of the switch M. The holding circuit for the coil of the switch M may be traced from the previously energized conductor 95 through an interlock 108 on the switch M, conductors 99 and 101, the actuating coil 102 and thence to the battery 65 through the circuit previously traced. The holding circuit for the actuating coil of the valve 43 extends from conductor 95 through the interlock 108 to the conductor 99, and thence to the actuating coil 106 through the circuit previously traced.

Since the sequence drum 38 is in the "off" position, the electromagnet 49, which actuates the trigger 51 on the notching device 45, is energized through a circuit which may be traced from a contact finger 109, which engages the segment 89 on the controller 60, conductors 111 and 112, contact fingers 113 and 114—bridged by a segment 115 on the sequence drum 38—conductor 116, contact member 117 on the relay 64, conductor 118, contact fingers 119 and 121—bridged by segment 122 on the sequence drum 66—conductors 123 and 124, contact fingers 125 and 126—bridged by segment 127 on the sequence drum 38—conductors 128 and 129, the energizing coil of the electromagnet 49, conductors 131, 132 and 133, contact members 134 on the notching device 45, conductor 135, contact members 136 on the notching device 53, and conductors 103 and 104 to the negative terminal of the battery 65.

The energization of the electromagnet 49 causes the trigger 51 to engage the rack 48 and also establishes an energizing circuit for the actuating coil of the magnet valve 52. This circuit may be traced from the positive terminal of the battery 65 through conductor 85, contact members 137 on the electromagnet 49, conductor 138, the actuating coil 139 of the magnet valve 52, to conductor 132, and thence through a circuit previously traced to the negative terminal of the battery 65.

The energization of the actuating coil of the magnet valve 52 operates the valve to admit air to the cylinder 47, thereby actuating the piston 46 to advance the sequence drum 38 one notch and also rotate the rotary valve 37 which is driven by the same shaft as the sequence drum, as explained hereinbefore. The rotation of the valve 37 admits air to a pipe 141, which is connected to the cylinder 36 of the tap-changing switch 21, thereby actuating the piston 34 to close the switch 21.

It will be noted that contact segments 142 are provided on the sequence drum 38 to bridge contact fingers 143 and 144, thereby maintaining the energization of the electromagnet 49 and the magnet valve 52 to carry the sequence drum from one position to the next. The contact fingers 143 and 144 are connected parallel to the contact members 134, which are opened when the piston 46 nears the end of its stroke.

The interruption of the circuit through the contact members 134 deenergizes the electromagnet 49 and the magnet valve 52, thereby causing the piston 46 to be retrieved in the cylinder 47. The retrieving of the piston 46 permits the contact members 134 to reclose, thereby reenergizing the electromagnet 49 and the magnet valve 52 which causes the notching device 45 to repeat another stroke, and actuate the sequence drum 48 to position 2.

The operation of the sequence drum to position 2 energizes the actuating coil of the transition switch A, thereby completing the connecting of the motor 10 to the transformer 15. The energizing circuit for the actuating coil of the switch A may be traced from the previously energized conductor 95 through contact fingers 96 and 145 bridged by the segment 98, conductor 146, the actuating coil 147 of the switch A and conductors 103 and 104 to the negative terminal of the battery 65.

The power circuit through the motor 10 may be traced from a tap 1 on the secondary winding 15 of the transformer 13 through the contact members of the tap-changing switch 21, bus 61, contact member 148 on the switch A, conductor 149, a part of the secondary winding 32 of the auxiliary transformer 28, the armature winding 11 and series field winding 12 of the motor 10, conductor 151, the contact members of the switch M and conductor 152 to the 0 tap of the transformer 13.

At this time, the vernier switches E and F are closed, thereby energizing the primary winding 31 of the auxiliary transformer 28 to cause this transformer to reduce the voltage applied to the motor 10 in the manner explained hereinbefore. The energizing circuit for the actuating coil of the switch E may be traced from the previously energized conductor 95 through contact fingers 153 and 154 bridged by a segment 155 on the sequence drum 66, conductor 156, the actuating coil 157 of the switch E, conductor 158, an interlock 159 on the switch G, conductor 161, interlock 162 on the switch I and conductors 163, 103 and 104 to the negative terminal of the battery 65. The circuit for the actuating coil of the switch F extends from a contact finger 183 through conductor 184, the actuating coil 185 of the switch F, conductor 186, an interlock 187 and conductors 188 and 163 to the negative conductor 103.

It will be noted that the circuit through the contact fingers 125 and 126 on the sequence drum 38 is interrupted when the drum reaches position 2. However, at this time, the switch A is closed and the switch C is opened, thereby establishing a circuit from conductor 123 through interlocks 164 and 165 on the switches A and C, respectively, to conductor 128. In this manner, the energizing circuit for the electromagnet 49 is reestablished, thereby causing the notching device 45 to operate the sequence drum 38 to position 3, where the circuit through the contact finger 114 on the sequence drum 38 is interrupted.

The advancement of the sequence drum 38 to position 3 causes the rotary valve 37 to admit air to a pipe 166 which is connected to the cylinder of the switch 22, thereby causing the contact members of this switch to connect the tap 2 of the transformer 13 to the bus 62.

At this time, a circuit is established for the energizing coil of the electromagnet 74 of the notching device 67 for the sequence drum 66. This circuit may be traced from the previously energized conductor 111 through contact fingers 167 and 168—bridged by segment 169—conductors 171 and 172, the energizing coil of the electromagnet 74, conductors 173 and 174, contact members 175 on the notching device 67, conductor 176, contact members 177 on the notching device 68, and conductor 178 to the negative conductor 103.

The energization of the electromagnet 74 causes the trigger 75 to engage the rack 73 and also establishes an energizing circuit for the actuating coil of the magnet valve 76. This circuit may be traced from the positive conductor 85 through conductor 86, actuating coil 179 of the magnet valve 76, conductor 181, contact members 182 on the electromagnet 74 to conductor 174 and thence to the negative conductor 103 through a circuit just previously traced.

The energization of the actuating coil of the magnet valve 76 admits air to the cylinder 72, thereby actuating the piston 71 to advance the sequence drum 66 one notch to position 2.

As shown in the sequence chart in Fig. 5, the operation of the sequence drum 66 to position 2 causes the switch E to open and switch G to close, thereby increasing the voltage applied to the motor 10 in the manner hereinbefore explained. The energizing circuit for the actuating coil of the switch G may be traced from contact finger 191, which engages the segment 155 of the sequence drum 66, through conductor 192, interlock 193 on the switch E, conductor 194, actuating coil 195 of the switch G, conductor 196, an interlock 197 on the switch I and conductor 163 to the negative conductor 103.

As explained hereinbefore, the contact members 175 on the notching device 67 are opened at the end of each stroke to deenergize the electromagnet 74 and permit the piston 71 to be retrieved. However, contact segments 198 are provided on the sequence drum to insure the completion of each notch.

The notching device 67 operates in the foregoing manner to advance the sequence drum 66 to positions 3 and 4, thereby energizing the actuating coils of the vernier switches H and I in sequential relation. The circuit through the actuating coil of the switch H may be traced from a contact finger 201 on the sequence drum 66, conductor 202, interlock 203 of the switch F, conductor 204, the actuating coil 205 of the switch H, conductor 206, and conductor 163 to the negative conductor 103. The circuit for the actuating coil of the switch I extends from the contact finger 207 through conductor 208, an interlock 209 on the switch E, conductor 211, interlock 212 on the switch G, conductor 213, actuating coil 214 of the switch I, and conductor 163 to the negative conductor 103.

The sequence drum 66 stops on position 4, thereby reestablishing the energizing circuit for the electromagnet 49 on the notching device 45. This circuit may be traced from a contact finger 215, which engages the segment 115 on the sequence drum 38, through conductor 216, contact member 217 on the relay 64, which is in its uppermost position at this time since switches 21 and 22 are both closed to energize the buses 61 and 62, conductor 218, contact fingers 219 and 121—bridged by a segment 221 on the sequence drum 66 to conductor 123 and thence to the energizing coil of the electromagnet 49 through a circuit previously traced.

Therefore, the notching device 45 repeats another stroke and actuates the sequence drum 38 to position 4, thereby opening the transition switch A and closing the transition switch C. The energizing circuit for the actuating coil of the switch C may be traced from a contact finger 222, which engages the segment 98 of the sequence drum 28, through conductor 223, and the actuating coil 224 on the switch C to the negative conductor 103.

The opening of the switch A and closing of the switch C transfers the circuit from the interlocks 164 and 165 to interlocks 225 and 226 on the switches A and C, respectively, thereby reenergizing the electromagnet 49 which causes the notching device 45 to advance the sequence drum 38 to position 5.

As shown in the sequence chart in Fig. 4, the tap-changing switch 21 is permitted to open when the sequence drum 38 is actuated to position 5. The opening of the switch 21 permits the relay 64 to drop to its lower-most position, thereby reestablishing the energizing circuit for the trigger magnet 49 of the notching device 45. This circuit may be traced from a contact finger 227 on the sequence drum 38, conductor 228, contact member 229 on the relay 64 to conductor 218 and thence to the electromagnet 49 through a circuit previously traced.

In this manner, the sequence drum 38 is actuated to position 6, at which time the tap-changing switch 23 is closed. The closing of the tap-changing switch 23 again energizes the relay 64, which is raised to its uppermost position, thereby interrupting the energizing circuit for the electromagnet 49, and the sequence drum is held on position 6 while the notching device 68 actuates the sequence drum 66 from position 4 to position 1, thereby closing the vernier switches I to E to gradually increase the voltage applied to the motor 10 as hereinbefore explained. The energizing circuit for the coil of the electromagnet 81 on the notching device may be traced from the previously energized conductor 111 through contact fingers 167 and 231—bridged by a segment 232 on the sequence drum 38—conductors 233, 234 and 235, the coil of the electromagnet 81, and conductor 236 to the conductor 174 and thence to the negative conductor 103 through a circuit previously traced.

The energization of the electromagnet 81 causes the trigger 82 to engage the rack 79 and also establishes an energizing circuit for the actuating coil of the magnet valve 83. This circuit may be traced from the positive conductor 85 through conductors 86 and 237, contact members 238 on the electromagnet 81, conductor 239, the actuating coil 241 of the magnet valve 83 to the conductor 174 and thence to the negative conductor 103 as previously traced.

The operation of the magnet valve 83 admits air pressure to the cylinder 78 and the notching device 68 retrieves the sequence drum 66 step-by-step in a manner similar to the advancement of the drum by the notching device 67.

When the sequence drum 66 is retrieved to position 1, the energizing circuit for the electromagnet 49 on the notching device 45 is reestablished, thereby causing the sequence drum 38 to be advanced to position 7. The circuit for the electromagnet 49 may be traced from contact finger 242 on the sequence drum 38, conductor 243, a contact member 244 on the relay 64, which is now in its uppermost position since switches 22 and 23 are both closed, and conductor 245 to the conductor 118 and thence through a circuit previously traced for electromagnet 49.

When the sequence drum 38 is actuated to position 7, the transition switch C is opened and the switch A closed in the manner hereinbefore explained. The notching device 45 then repeats another stroke, actuating the sequence drum 38 to position 8 where the tap-changing switch 22 is permitted to open, as indicated on the sequence chart in Fig. 4. The notching device 45 then advances the sequence drum 38 to position 9, the energizing circuit for the electromagnet 49 being transferred to conductor 116 and through contact member 117 on the relay 64, which is now in its lowermost position, and thence through a circuit previously traced to the electromagnet 49.

When the sequence drum 38 is advanced to position 9, the tap-changing switch 24 is closed, and the relay 64 is actuated to its uppermost position, thereby interrupting the energizing circuit for the electromagnet 49 and the sequence drum 38 is held on position 9 while the sequence drum 66 is actuated from position 1 to position 4 to close the vernier switches E to I in the manner hereinbefore explained.

The foregoing sequence of operation of the sequence drums 38 and 66 is carried on until the tap-changing switch 27 is closed to apply maximum voltage to the motor 10, provided the master controller 60 is held in the "raise" position.

If it is desired to stop the progression of the control system at any time, the master controller 60 may be actuated to the "raise hold" or "lower hold" position, thereby deenergizing the electromagnet 49 on the notching device 45 and the electromagnet 74 on the notching device 67. It will be noted that carry-over contact segments 246 are provided on the sequence drum 66 to insure the completion of any step of the drum 66 that may be in progress when the controller 60 is moved to the "raise hold" position by maintaining the energizing circuit for the electromagnet 74 of the notching device 67. This circuit may be traced from a contact finger 247, which engages a segment 248 on the controller 60, through conductor 249, contact fingers 251 and 252 on the sequence drum 66 to conductor 171 and thence through a circuit previously traced for the energizing coil of the electromagnet 74. As previously explained, the sequence drum 38 is so constructed that it is always actuated from one full notch to the next full notch higher or lower depending on the "hold" position selected and will not stop between positions.

In case it is desired to lower the voltage applied to the motor 10, the master controller 60 may be actuated to the "lower" position, thereby energizing the electromagnet 57 on the notching device 58, which returns the sequence drum 38 towards the "off" position step-by-step in the same manner as the notching device 45 advances the drum. The energizing circuit for the electromagnet 57 may be traced from a contact finger 253 on the master controller 60, conductors 254 and 255, to contact finger 250 and thence through one of the contact fingers 256, 257, 258 or 259, which engages a segment 260, on the sequence drum 38, and conductor 261, 262, 263 or 264, then through one of the contact members 265, 266, 267 or 268 on the relay 64, depending upon the position of the relay, either by conductor 269, and contact fingers 271 and 272—bridged by a contact segment 273 on the sequence drum 66—or through conductor 274 and contact fingers 275 and 272, which may be bridged by a segment 276 on the sequence drum 66, to conductor 277, either interlocks 278 and 279 on the switches A and C, respectively, or interlocks 281 and 282 on the switches, depending upon the relative positions of the switches, conductor 283, the energizing coil of the electromagnet 57, conductor 284, conductors 132 and 133, contact members 134, conductor 135, and contact member 136 to the negative conductor 103.

The closing of contact members 285 by the electromagnet 57 establishes a circuit for the actuating coil of the magnet valve 59, thereby admitting air to the cylinder 55 to operate the piston 54 to cause the notching device 53 to retrieve the sequence drum 38 in the manner previously described. The energizing circuit for the magnet valve 59 may be traced from the positive terminal of the battery 65 through conductor 286, the actuating coil 287 of the magnet valve 59, conductor 288, contact members 285, conductor 132 and thence to the negative conductor 103 through a circuit previously traced.

In the event that the sequence drum 66 is on position 2 or 3, when the master controller is actuated to the "lower" position, one of the notching devices 67 or 68, depending upon which direction the drum 66 is being moved at the time, returns the drum 66 to either position 1 or position 4, whereupon the drum 38 is actuated towards the off position in the manner described in the preceding paragraphs. As explained hereinbefore, the drum 66 is rotated only when the drum 38 is on positions 3, 6, 9, 12, 15 or 18, and it is necessary for the drum 66 to be either on position 1 or position 4 before the drum 38 can be rotated.

The notching devices 67 and 68 rotate the sequence drum 66 to operate the vernier switches E to I, inclusive during the lowering sequence in the same manner as during the raising of the voltage applied to the motor 10. A series of contact segments 291 and 292 are provided on the sequence drum 38 to bridge contact fingers 293 and 294 or 293 and 295, respectively, to operate the notching devices 67 and 68 in the manner hereinbefore explained.

The sequence drums 38 and 66 may be retained on any position during the lowering operation by actuating the controller to the "lower hold" or "raise hold" position, thereby deenergizing the notching devices for the sequence drums. Carry-over contact sgments 296 are provided on the sequence drum 66 to maintain the energizing circuit for the electromagnet 81 to insure that the sequence drum 66 does not stop between positions. This circuit may be traced from a contact finger 297 on the controller 60 through conductor 298 and contact fingers 299 and 301 to conductor 234 and thence through a circuit previously traced for the energizing coil on the electromagnet 81.

If the master controller 60 is actuated to the "off" position at any time during the operation of the control system, transition switches A and C, motor cut-out switch M and the vernier switches E to I, inclusive, are opened, and the air valve 43 is closed at once, thereby removing all power from the traction motor 10, and the sequence drum 38 must be returned to the "off" position before power can be reapplied to the motor. Contact fingers 302 and 303, which engage a contact segment 304 on the master controller 60, are provided for energizing the lowering notching devices 53 and 68, respectively, to return the sequence drums 38 and 66 to the "off" position. As shown, contact finger 303 is connected to conductor 235, which energizes the electromagnet 81 of the notching device 68, and contact finger 302 is connected to conductor 283 by conductor 305, thereby energizing the electromagnet 57 on the notching device 53.

In order to simplify the drawings and description, only a small number of tap-changing switches and vernier switches has been shown. It will be understood that the number of taps on the main transformer may be increased, if desired, and furthermore, that the number of voltage steps obtainable may be still further increased without increasing the number of taps by utilizing more vernier switches, thereby increasing the number of voltage steps obtained for each tap on the main transformer.

From the foregoing description, it is apparent that I have provided a control system suitable for controlling the operation of electrically propelled vehicles which will provide a large number of voltage steps for a comparatively small number of taps on the power transformer, thereby improving the smoothness of operation and performance of the vehicle without greatly increasing the cost of the equipment. It is also evident that I have provided a system which will reduce the duty imposed upon the switching apparatus of the system, thereby prolonging the life of the apparatus.

Since numerous changes may be made in the above described construction and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a tap-changing system, in combination, a main transformer, a plurality of switches for changing taps on said transformer to vary the voltage on a power circuit, transition switches cooperating with the tap-changing switches to prevent them from opening and closing the power circuit, an auxiliary transformer having its primary winding energized from the main transformer and its secondary winding associated with the transition switches for controlling the voltage across said transition switches and control means for preventing the simultaneous operation of the tap-changing and the transition switches.

2. In a tap-changing system, in combination, a main transformer, a plurality of switches for changing taps on said transformer to vary the voltage on a power circuit, transition switches cooperating with the tap-changing switches to prevent them from opening and closing the power circuit, an auxiliary transformer having its primary winding energized from the main transformer and its secondary winding associated with the transition switches for controlling the voltage across said transition switches, means for varying the voltage of the auxiliary transformer, and control means for preventing the simultaneous operation of the tap-changing and the transition switches.

3. In a tap-changing system, in combination, a main transformer, a plurality of switches for changing taps on said transformer to vary the voltage on a power circuit, transition switches cooperating with the tap-changing switches to prevent them from opening and closing the power circuit, an auxiliary transformer having its secondary winding associated with the transition switches for controlling the voltage across said transition switches, means for connecting the primary winding of the auxiliary transformer to successive taps on the main transformer to vary the voltage of the auxiliary transformer, and control means for preventing the simultaneous operation of the tap-changing and the transition switches.

4. In a tap-changing system, in combination, a main transformer, a plurality of switches for changing taps on said transformer, transition switches for connecting the tap-changing switches to a power circuit to prevent them from opening and closing the power circuit, an auxiliary transformer having its secondary winding associated with the transition switches for controlling the voltage across said transition switches, a plurality of switches for connecting the primary winding of the auxiliary transformer to successive taps on the main transformer to vary the voltage of the secondary winding of the auxiliary transformer, and control means for preventing the simultaneous operation of the tap-changing and the transition switches.

5. In a tap-changing system, in combination, a main transformer, a plurality of switches for changing taps on said transformer, transition switches for connecting the tap-changing switches to a power circuit to prevent them from opening and closing the power circuit, an auxiliary transformer having its secondary winding associated with the transition switches for controlling the voltage across said transition switches, a plurality of switches for so connecting the primary winding of the auxiliary transformer to successive taps on the main transformer that the auxiliary transformer alternately bucks and boosts the voltage applied to the power circuit, and control means for preventing the simultaneous operation of the tap-changing and the transition switches.

6. In a tap-changing system, in combination, a main transformer, a plurality of switches for changing taps on said transformer, transition switches for connecting the tap-changing switches to a power circuit, control means for controlling the operation of said switches to prevent the tap-changing switches from opening and closing the power circuit, an auxiliary transformer having its primary winding energized from the main transformer and its secondary winding associated with the transition switches for controlling the voltage across said transition switches, and control means for preventing the simultaneous operation of the tap-changing and the transition switches.

7. In a tap-changing system, in combination, a main transformer, a plurality of switches for changing taps on said transformer, transition switches for connecting the tap-changing switches to a power circuit, control means for controlling the operation of said switches to prevent the tap-changing switches from opening the power circuit, an auxiliary transformer associated with the transition switches for controlling the voltage across said transition switches, and a plurality of switches for so connecting the auxiliary transformer to successive taps on the main transformer that the auxiliary transformer alternately bucks and boosts the voltage obtained from the main transformer.

8. In a tap-changing system, in combination, a main transformer, a plurality of switches for changing taps on said transformer, transition switches for connecting the tap-changing switches to a power circuit, control means for controlling the operation of said switches to prevent the tap-changing switches from opening the power circuit, an auxiliary transformer associated with the transition switches for controlling the voltage across said transition switches, a plurality of switches for so connecting the auxiliary transformer to successive taps on the main transformer that the auxiliary transformer alternately bucks and boosts the voltage obtained from the main transformer, and control means cooperating with said first-named control means to control the operation of said last-named switches.

9. In a tap-changing system, in combination, a main transformer, a plurality of switches for changing taps on said transformer, an auxiliary transformer having a primary winding and a secondary winding, a power circuit connected between said secondary winding and the main transformer, transition switches for connecting the tap-changing switches to said secondary winding, means for connecting said primary winding to successive taps on the main transformer to vary the voltage of the auxiliary transformer, and control means for preventing the simultaneous operation of the tap-changing and the transition switches.

10. In a tap-changing system, in combination, a main transformer, a plurality of switches for changing taps on said transformer, an auxiliary transformer having a primary winding and a secondary winding, a power circuit connected between said secondary winding and the main transformer, transition switches for connecting the tap-changing switches to said secondary winding, and a plurality of switches for so connecting said primary winding to successive taps on the main transformer that the auxiliary transformer alternately bucks and boosts the voltage applied to the power circuit.

WILLIAM R. TALIAFERRO.